US012679983B2

(12) United States Patent
Konishi et al.

(10) Patent No.: US 12,679,983 B2
(45) Date of Patent: **\*Jul. 14, 2026**

(54) COATING LIQUID COMPOSITION, SUBSTRATE WITH COATING FILM, SEPARATOR, SECONDARY BATTERY, AND ELECTRODE MATERIAL

(71) Applicant: Resonac Corporation, Tokyo (JP)

(72) Inventors: Jun Konishi, Tokyo (JP); Atsushi Sugawara, Tokyo (JP)

(73) Assignee: Resonac Corporation, Tokyo (JP)

( * ) Notice: Subject to any disclaimer, the term of this patent is extended or adjusted under 35 U.S.C. 154(b) by 575 days.

This patent is subject to a terminal disclaimer.

(21) Appl. No.: 18/025,715

(22) PCT Filed: Sep. 14, 2021

(86) PCT No.: PCT/JP2021/033781
§ 371 (c)(1),
(2) Date: Mar. 10, 2023

(87) PCT Pub. No.: WO2022/059677
PCT Pub. Date: Mar. 24, 2022

(65) Prior Publication Data
US 2023/0348735 A1 Nov. 2, 2023

(30) Foreign Application Priority Data
Sep. 17, 2020 (JP) ................................. 2020-156619

(51) Int. Cl.
*C09D 7/43* (2018.01)
*C09D 7/20* (2018.01)
(Continued)

(52) U.S. Cl.
CPC ................. *C09D 7/43* (2018.01); *C09D 7/20* (2018.01); *C09D 7/61* (2018.01); *C09D 7/65* (2018.01); *H01M 4/622* (2013.01); *H01M 10/0525* (2013.01); *H01M 50/417* (2021.01); *H01M 50/457* (2021.01)

(58) Field of Classification Search
None
See application file for complete search history.

(56) References Cited

FOREIGN PATENT DOCUMENTS

CN 102124591 A 7/2011
CN 107112477 A 8/2017
(Continued)

OTHER PUBLICATIONS

Imamura et al, JP 2018166062 A, English Translation from EPO (Year: 2018).*
(Continued)

*Primary Examiner* — Colin W. Slifka
(74) *Attorney, Agent, or Firm* — Sughrue Mion, PLLC

(57) ABSTRACT

Provided is a coating liquid composition that is less likely to deform even when heat is applied to a coating liquid for a paint mainly containing a polymer, an ink, an adhesive, and an anode, a cathode, or a separator of a lithium ion battery, for example. The coating liquid composition includes a filler, a solvent, a dispersant, and a thickener. When the coating liquid composition is applied to a substrate to form a coating film having a thickness of 0.5 to 20 μm, the coating film has a shrinkage rate of 20.0% or less when heating at 200° C. for 15 minutes.

14 Claims, 1 Drawing Sheet

COATING FILM AFTER HEAT RESISTANCE TEST

(51) Int. Cl.
  C09D 7/61    (2018.01)
  C09D 7/65    (2018.01)
  H01M 4/62    (2006.01)
  H01M 10/0525  (2010.01)
  H01M 50/417   (2021.01)
  H01M 50/457   (2021.01) .

(56)     References Cited

FOREIGN PATENT DOCUMENTS

| | | |
|---|---|---|
| DE | 11 2015 004 712 T5 | 7/2017 |
| EP | 2 623 317 A1 | 8/2013 |
| JP | 2013-101954 A | 5/2013 |
| JP | 5829557 B2 | 12/2015 |
| JP | 2016-100135 A | 5/2016 |
| JP | 2019-160707 A | 9/2019 |
| JP | 2020-145123 A | 9/2020 |
| TW | 201412384 A | 4/2014 |
| TW | 201532335 A | 8/2015 |
| WO | WO-2010104127 A1 * 9/2010 .......... H01M 50/457 |
| WO | 2018/070473 A1 | 4/2018 |
| WO | 2020/085123 A1 | 4/2020 |

OTHER PUBLICATIONS

Matsumoto et al, WO 2010104127 A1, English Translation from FIT (Year: 2010).*

* cited by examiner

[Fig. 1]
COATING FILM BEFORE HEAT RESISTANCE TEST
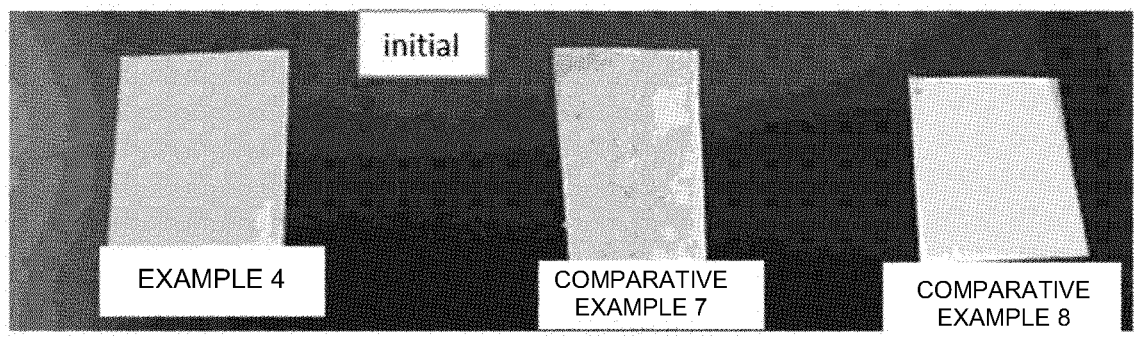
[Fig. 2]
COATING FILM AFTER HEAT RESISTANCE TEST
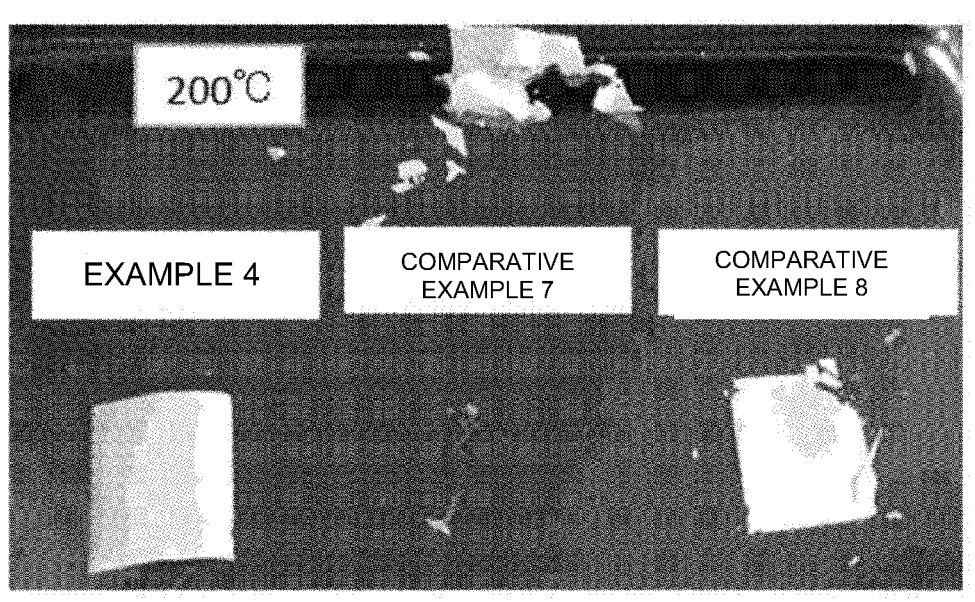

COATING LIQUID COMPOSITION, SUBSTRATE WITH COATING FILM, SEPARATOR, SECONDARY BATTERY, AND ELECTRODE MATERIAL

CROSS REFERENCE TO RELATED APPLICATIONS

This application is a National Stage of International Application No. PCT/JP2021/033781 filed on Sep. 14, 2021, claiming priority based on Japanese Patent Application No. 2020-156619 filed on Sep. 17, 2020.

TECHNICAL FIELD

The present invention relates to a coating liquid composition including a filler, a solvent, a dispersant, and a thickener and to a substrate with a coating film containing the coating liquid composition of the present invention, the coating liquid composition capable of forming a coating film that is less likely to deform even when heat is applied to a coating liquid for a paint mainly containing a polymer, an ink, an adhesive, an anode, a cathode, or a separator of a lithium ion battery, for example.

BACKGROUND ART

Coating and printing techniques using compositions are widely used in industrial fields in general from the viewpoints of environment and safety as well as efficiency.

However, a factor contributing to heat resistance and shape retention of a coating film with a certain porosity maintained in a substrate has not been understood.

In Patent Literature 1, a suspension of fibrous cellulose diluted with ion exchanged water has a specific TI value (thixotropy index) to enhance the dispersibility and ease of application of a battery separator coating liquid. Meanwhile, this literature does not disclose a TI value in a state of containing a composition other than fibrous cellulose and ion exchanged water nor describe or suggest a factor contributing to heat resistance.

Patent Literature 2 discloses a coating liquid having excellent coating properties and capable of forming a uniform coating film, but the content of a water-soluble component in the coating liquid is 5% by mass or less, and thus the coating liquid is in a state in which the solid content is large with respect to the water-soluble component.

None of these Patent Literatures necessarily suggests anything from the viewpoint of heat resistance and deformability. Particularly, in the case where a battery such as a lithium-ion secondary battery is mounted on, for example, an electric vehicle, if the temperature exceeds the crystalline melting point of polypropylene of a porous polyolefin film contained in a coating film in the event of abnormal heat generation, the pore diameter is generally reduced to interrupt lithium ions, thereby suppressing further heat generation. However, in the case where the temperature further increases, a temperature at which the separator film melts and breaks is referred to as a meltdown temperature. When the temperature exceeds this meltdown temperature, it is known that the polyolefin film shrinks, leading to a short circuit between the anode and the cathode which may cause ignition.

CITATION LIST

Patent Literature

Patent Literature 1: WO2018/070473
Patent Literature 2: Japanese Patent No. 5829557

SUMMARY OF INVENTION

Technical Problem

Since it is possible to prevent the above-described problem if the shape of the substrate can be maintained during heating, the present inventors have considered that the above-described problem would be solved by limiting the characteristics of the coating film, but it has been completely unclear what characteristics should be provided to the coating film or the coating liquid.

Solution to Problem

As a result of intensive study under such a situation, the present inventors have found that when a coating film is formed from a coating liquid under predetermined conditions, a coating film having excellent heat deformation resistance and a smooth surface can be formed by setting a shrinkage rate of the coating film to a predetermined range and sufficiently used in the above-described applications, and thus the present invention has been completed.

In other words, the configuration of the present invention is as follows.

[1] A coating liquid composition, including:

a filler, a solvent, a dispersant, a thickener, and a binder, wherein when the coating liquid composition is applied to a substrate to form a coating film having a thickness of 0.5 to 20 μm, the coating film has a shrinkage rate of 20.0% or less when heating at 200° C. for 15 minutes.

[2] The coating liquid composition according to [1], wherein the filler accounts for 20% by mass or more of the coating liquid composition.

[3] The coating liquid composition according to [1] or [2], wherein the thickener is a poly-N-vinylcarboxylic acid amide.

[4] The coating liquid composition according to [1] to [3], wherein the thickener is poly-N-vinylacetamide.

[5] The coating liquid composition according to [1] to [4], wherein the solvent is water.

[6] The coating liquid composition according to [1] to [5], wherein the binder is an emulsion selected from an acrylic emulsion and a styrene-butadiene polymer emulsion.

[7] The coating liquid composition according to [1] to [6], wherein the substrate is a polyolefin film.

[8] The coating liquid composition according to [7], wherein the polyolefin film is at least one selected from polyethylene and polypropylene.

[9] The coating liquid composition according to [7] or [8], wherein the polyolefin film is a three-layer laminated film of polypropylene, polyethylene, and polypropylene.

[10] The coating liquid composition according to [1] to [9], wherein a mass ratio of the filler to the thickener in the coating liquid composition is 0.1 to 200.

[11] The coating liquid composition according to [1] to [10], wherein the thickener has a viscosity of 30 mPa·s or more and 10000 mPa·s or less in terms of actual viscosity.

[12] A substrate with a coating film, including a coating film formed from the coating liquid composition according to [1] to [11] and a substrate.

[13] A separator including the substrate with a coating film according to [12].

[14] A secondary battery using the separator according to [13].

[15] A lithium-ion secondary battery using the separator according to [13].

[16] An electrode material including a coating film formed from the coating liquid composition according to [1] to [11] on a surface of a substrate.

Advantageous Effects of Invention

The coating liquid composition of the present invention can suppress the deformation of a substrate because thermal deformation of a coating film is small, and can be used as an electrode material that is less likely to change even in a high-temperature environment of an automobile, for example. If such a technique is adopted for a coating film of, for example, an electrode or a separator of a secondary battery, particularly a lithium-ion secondary battery, the safety of the secondary battery at the time of heat generation can be improved.

BRIEF DESCRIPTION OF DRAWINGS

FIG. 1 shows optical photographs of coating films of Example 7 and Comparative Examples 7 and 8 before the heat resistance test.

FIG. 2 shows optical photographs of coating films of Example 7 and Comparative Examples 7 and 8 after the heat resistance test.

DESCRIPTION OF EMBODIMENTS

Hereinafter, embodiments of the present invention will be described.

Coating Liquid Composition

The coating liquid composition of the present embodiment includes a filler, a thickener, a solvent, a dispersant, and a binder.

When such a coating liquid composition is applied to a substrate and dried to form a coating film having a thickness of 0.5 to 20 µm, the coating film has a shrinkage rate of 20.0% or less when heating at 200° C. for 15 minutes.

The shrinkage rate of the coating film when heating at 200° C. for 15 minutes is 20.0% or less, preferably 15.0% or less, and more preferably 7.0% or less. The shrinkage rate of the coating film when heating at 200° C. for 15 minutes is preferably 0.01% or more, more preferably 2.0% or more, and even more preferably 5.0% or more. The shrinkage rate is measured by a method described in Examples. The shrinkage rate within the above range is preferred because the coating film has excellent heat resistance.

The substrate is preferably a polyolefin film and preferably at least one selected from polyethylene and polypropylene. The substrate is also preferably a three-layer laminated film of polypropylene, polyethylene, and polypropylene. The size and thickness of the film are not particularly limited.

Filler

The filler may be an inorganic filler or an organic filler but is preferably an inorganic filler such as alumina, boehmite, talc, kaolin calcium carbonate, calcium phosphate, magnesium oxide, amorphous silica, a crystalline glass filler, titanium dioxide, a silica-alumina composite oxide particle, barium sulfate, calcium fluoride, lithium fluoride, zeolite, molybdenum sulfide, and mica. Of these, alumina and boehmite are more preferred.

The shape of the filler is not particularly limited and may be spherical, polyhedral, plate, scale, columnar, tubular, or even fibrous.

In the case where the filler has a shape other than a spherical or regular polyhedral shape, the aspect ratio of the filler is preferably 2 or more, more preferably 5 or more, and even more preferably 10 or more. If the aspect ratio of the filler is 2 or more, an effect of making it difficult for the lithium dendrite to penetrate the separator is exhibited by a laminating effect of the filler when the lithium dendrite grows. Note that the aspect ratio of the filler is preferably 100 or less.

It is desirable that the long diameter of the filler be preferably in the range of 0.1 to 1000 µm, and more preferably in the range of 1 to 100 µm.

It is desirable that the short diameter of the filler be preferably in the range of 0.01 to 100 µm, and more preferably in the range of 0.1 to 10 µm.

It is desirable that the 50% particle diameter $D_{50}$ of the filler in volume-based cumulative particle size distribution be preferably in the range of 0.01 to 1000 µm, and more preferably in the range of 0.1 to 100 µm.

Thickener

Preferred examples of the thickener include poly-N-vinylcarboxylic acid amide; poly-N-vinyl pyrrolidone: sodium salts of carboxymethylcellulose; polyacrylamide; polyvinyl alcohol; polysaccharides such as carrageenan, xanthan gum, guar gum, and pectin; cellulosic polymers such as carboxymethylcellulose, hydroxymethylcellulose, hydroxyethylcellulose, methyl ethyl hydroxycellulose, methylcellulose, and hydroxypropyl cellulose; and ammonium salts and alkali metal salts of these cellulosic polymers.

The thickener is preferably a poly-N-vinylcarboxylic acid amide, and more preferably a poly-N-vinylacetamide. The use of such a thickener makes it possible to form a coating film having small thermal deformation and to obtain a coating film having an excellent coating surface appearance.

Specific examples of monomers constituting the poly-N-vinylcarboxylic acid amide include N-vinylformamide, N-vinylacetamide, N-vinyl propionamide, N-vinylbenzamide, N-vinyl-N-methylformamide, N-vinyl-N-ethylformamide, N-vinyl-N-methylacetamide, N-vinyl-N-ethylacetamide, and N-vinyl pyrrolidone. Of these, N-vinylacetamide is particularly preferred due to its coating properties and affinity for a solvent containing water.

The poly-N-vinylcarboxylic acid amide may be a homopolymer or a copolymer. In the case of copolymerization, in addition to N-vinylcarboxylic acid amide, it is also possible to copolymerize acrylonitrile, vinyl acetate, acrylic acid, methacrylic acid, and salts of acrylic acid, methacrylic acid, itaconic acid, maleic acid, crotonic acid, and other acids. However, copolymerization is not particularly limited. The content of an N-vinylacetamide-derived component in the poly N-vinylcarboxylic acid amide is preferably 60 mol % or more.

The thickener preferably has a viscosity of 30 mPa·s to 10000 mPa·s in terms of actual viscosity (without adjusting the solution concentration). The viscosity is in this range is preferred because the coating can be easily performed.

Binder

Suitable binders are emulsions in which resins such as styrene-butadiene resin and acrylic resin are dispersed in water and various rubber-based latexes. Among them, acrylic emulsion and emulsion of styrene-butadiene resin (styrene-butadiene polymer emulsion) are preferred, and cross-linking type acrylic emulsion is more preferred. The acrylic binder may be either a homopolymer or a copolymer. The emulsion may be used as it is or after being solidified.

The amount of the binder is preferably 1 part by mass or more, and more preferably 2 parts by mass or more with respect to 100 parts by mass of the filler. The amount of the binder is preferably 30 parts by mass or less, and more preferably 7 parts by mass or less, with respect to 100 parts by mass of the filler.

Solvent

The solvent is not particularly limited as long as it can disperse or dissolve the above-described components and does not react with them, but in view of drying properties, an easily volatile solvent is used. Specifically, water or a polar solvent compatible with water is used, and a solvent containing 50% by mass or more of water is preferred, and water alone is more preferred. Water is particularly preferably ion-exchanged water. Examples of solvents other than water include alcohols such as methanol, ethanol, and isopropanol. Water is preferred in terms of ease of handling in addition to the aforementioned drying properties and the ability to disperse or dissolve each component.

Dispersant

The coating liquid composition of the present embodiment may include a dispersant, if necessary. The dispersant is not particularly limited as long as the filler is dispersed in the solvent but is preferably dodecylbenzenesulfonic acid, polyvinyl alcohol, polyacrylamide, polymethacrylic acid, a higher alcohol ethylene oxide adduct, a polypropylene glycol ethylene oxide adduct, or a fatty acid ester of sorbitol or sorbitan. The salt is not particularly limited but is preferably an ammonium salt containing no metal.

In the case where the dispersant is contained, the amount thereof is preferably 0.1 parts by mass or more, and more preferably 0.5 parts by mass or more, with respect to 100 parts by mass of the filler. The amount of the dispersant is preferably 5 parts by mass or less, and more preferably 2 parts by mass or less, with respect to 100 parts by mass of the filler. When the dispersant is contained in this range, the dispersibility of the filler can be enhanced.

Composition and Preparation Method of Coating Liquid Composition

In the coating liquid composition of the present embodiment, the mass of the filler in the coating liquid composition is preferably in the range of 20 to 70% by mass, more preferably in the range of 25 to 60% by mass, and even more preferably in the range of 40 to 50% by mass. When the filler is contained in such an amount, a coating film having small thermal deformation can be formed.

The mass ratio of the thickener to the filler (filler/thickener) is preferably 0.1 or more and 200 or less, more preferably 30 or more and 150 or less, and even more preferably 60 or more and 100 or less. With this ratio, a coating film having a predetermined heat deformation resistance can be formed.

The solvent such as water corresponds to the remainder of the aforementioned components in the coating liquid composition, and usually, the amount of the filler is preferably 0.1 to 200 parts by mass and more preferably 40 to 100 parts by mass, with respect to 100 parts by mass of the solvent. When the solvent is in this range, good fluidity of the coating liquid composition can be obtained, the coating property is high, and the smoothness of the resulting coating film can be improved.

A method of mixing each component of the coating liquid composition is not particularly limited either, but in order to obtain a more uniform mixed state, it is preferable to disperse at least a binder, a thickener, and a dispersant in a solvent before adding and mixing a filler. It is more preferable to sequentially add the filler to a solution in which at least a binder, a thickener, and a dispersant have been dissolved, while continuously stirring the solution, and then stir, mix, and homogenize the mixture. As a result, an ideal mixed state can be obtained. In another aspect, it is also preferable to first add the dispersant to the filler and the solvent under stirring, crush the secondary aggregation, then add the binder and the thickener, and uniformly mix the components while suppressing reaggregation.

Application

The coating liquid composition of the present invention can be used in various coating liquids for a paint, an ink, an adhesive, and an anode, a cathode, or a separator of a lithium ion battery, for example, depending on the type of the filler to be blended.

The coating liquid composition can be used as a coating liquid as it is or can be used as a coating liquid by appropriately adjusting the concentration and the viscosity with, for example, a solvent, if necessary.

For example, a coating film is produced by coating the surface of a substrate with the coating liquid composition and drying it. A coating film composed of the coating liquid composition can be provided on the surface of the substrate (referred to as a substrate with a coating film) to form an electrode material.

When the coating liquid composition includes a thickener, it is also possible to provide a coating and drying method in which the drying time is significantly shortened.

The method of applying the coating liquid composition to the substrate is not particularly limited, but the coating liquid composition can be applied in a continuous manner using a roll-to-roll pattern coating device in addition to spray coating, roll coating, bar coating, gravure coating, die coating, knife coating, ink jet coating, brush coating, immersion coating, for example.

Further, the coating liquid composition may contain known materials to be added to the paint in addition to the above, for example, a thixotropic agent, a surface conditioner, a defoaming agent, a leveling agent, a pigment, a dye adhesive component, an adhesive component, and a tackifier.

As the substrate, a film, a nonwoven fabric, a porous body, a plate-like body, or the like can be used without particular limitation.

Examples of materials constituting the substrate include organic resin materials such as ethylene alone or copolymers of ethylene with other a-olefins, homopolypropylene, copolymers of propylene with other olefins, polyethylene terephthalate, polyethylene naphthalate, polyamide ether ketone, polyimide, polyamide, polyphenylene sulfone, polyphenylene ether, polyethylene, polyether sulfone, polyether ether ketone, polybenzimidazole, polyether imide, polyamide imide, poly(p-phenylene-2, 6-benzobisoxazole), fluorine resin, and epoxy resin; metallic materials such as aluminum, copper, silver, and iron; and inorganic materials such as glass (silicon oxide), alumina, magnesia, aluminum nitride, aluminum carbide, silicon nitride, and barium titanate. The substrate may be used alone or in combination of two or more. Among them, the substrate is preferably polyolefin, more preferably at least one selected from polyethylene and polypropylene, and most preferably a three-layer laminate in which polypropylene, polyethylene, and polypropylene are laminated in this order. In the case of using a porous substrate made of such a material, it can be used as a separator for a secondary battery. When the porous substrate is a polyolefin film, the polyolefin film is not particularly limited whether it is produced by a wet method or a dry method. In the case of a porous substrate composed of a three-layer laminate, it is preferable that all three layers are produced by a dry method. A material having such a configuration is free from curling and has, for example, good heat resistance and mechanical strength.

The dry method is a dry process in which a solvent is not used at the time of production, and examples thereof include melt molding and injection molding of a molten resin with a T-die. The outer layer and the inner layer may be formed by either a dry method or a wet method, and the wet method is a method in which a film is formed using a resin to which an additive is added and mixed, and then the additive is extracted with a solvent.

The thickness of the substrate as a whole is appropriately selected in terms of, for example, mechanical strength, performance, and miniaturization according to the purpose, and is preferably 7.0 μm or more. The upper limit thereof is preferably 50 μm or less. When the thickness is in this range, the substrate may have high strength and high ionic conductivity.

In the case of a porous substrate, the air permeability thereof is preferably 80 s/100 cc or more. The upper limit thereof is preferably 700 s/100 cc or less. When having air permeability in this range, the porous substrate is less likely to have a short circuit and has high ion mobility.

The porosity of the porous substrate is preferably 30% or more, and the upper limit thereof is preferably 70% or less. When the porosity is in this range, the substrate may have high mechanical strength, no short circuit, and high ion mobility.

The maximum pore diameter of the porous substrate is preferably 0.05 μm or more, and the upper limit thereof is preferably 2 μm or less. When the pore diameter is in this range, the porous substrate becomes large in the case of being used as a separator due to its high ion mobility and low resistance.

The method for drying the coating film is not particularly limited, and examples thereof include spin drying, vacuum drying, hot air drying, and infrared drying. The drying time is not particularly limited either.

In the case of forming a separator, the separator can be formed by, for example, a method of coating the coating liquid composition onto the surface of the substrate.

In the case of forming an electrode, a battery electrode can be formed by a method involving mixing the coating liquid composition with an anode active material or a cathode active material and then coating the mixture on the surface of the substrate or the surface of a current collector thereof, or by applying a mixture of the coating liquid composition with an anode active material or a cathode active material or both to an electrode foil or by forming the coating liquid composition into a thin film and then inserting the coating liquid composition into the surface of the current collector of the anode or the cathode or both.

The members constituting a lithium-ion secondary battery can be broadly divided into a positive electrode, a negative electrode, a separator, and an electrolyte. The positive electrode and the negative electrode each contain an active material that performs an oxidation/reduction reaction to send and receive electrons. The positive electrode and the negative electrode can be used in the form of an electrode group having a laminated structure in which the electrodes are laminated with a battery separator interposed therebetween, or an electrode group having a wound structure in which the electrode group is further wound.

The anode is not particularly limited as long as it is an anode used in a conventionally known lithium-ion secondary battery. The anode contains an active material capable of storing and releasing $Li^+$ ions.

The cathode is not particularly limited as long as it is a cathode used in a conventionally known lithium-ion secondary battery. The cathode contains an active material capable of storing and releasing $Li^+$ ions.

The anode and the cathode can be used in the form of an electrode group having a laminated structure in which the electrodes are laminated with a separator interposed therebetween, or an electrode group having a wound structure in which the electrode group is further wound. As the electrolyte, a solution of a lithium salt dissolved in an organic solvent is used. The lithium salt is not particularly limited as long as it dissociates in the solvent to form $Li^+$ ions and does not cause side reactions such as decomposition in the voltage range to be used for a battery. The organic solvent is not particularly limited as long as it dissolves the lithium salt and does not cause side reactions such as decomposition in the voltage range to be used for a battery.

Each member prepared using the coating liquid composition of the present invention is suitably used for each member of the aforementioned battery.

Lithium ion batteries are used for various conventionally known applications in addition to power supply applications for mobile devices such as mobile phones and notebook personal computers, and various devices such as electric vehicles, hybrid vehicles, electric motorcycles, power-assisted bicycles, power tools, and shavers.

EXAMPLES

Hereinafter, the present invention will be described with reference to Examples, but the present invention is not limited to these examples at all.

Materials Used

Filler

Alumina, AL160SG-3 manufactured by Showa Denko K.K., D50: 0.52 μm

Scaly boehmite: Cerasur (manufactured by KAWAI LIME INDUSTRY CO., LTD.) aspect ratio of 20 to 40

Scaly alumina: Cerasur α (manufactured by KAWAI LIME INDUSTRY CO., LTD.) aspect ratio of 20 to 40

Binder

Acrylic emulsion: POLYSOL (R) LB-350 (manufactured by Showa Denko K.K.)

SBR (styrene-butadiene rubber): BM400B (manufactured by Zeon Corporation)

Thickener

Poly-N-vinylacetamide PNVA (R)-1: GE191-043 (manufactured by Showa Denko K.K.), actual viscosity of 5000 mPa·s, solid content of 4% by mass Poly-N-vinylacetamide PNVA (R)-2: GE191-104 (manufactured by Showa Denko K.K.), actual viscosity of 18000 mPa·s, solid content of 10% by mass Poly-N-vinylacetamide PNVA (R)-3: GE191-107 (manufactured by Showa Denko K.K.), actual viscosity of 50 mPa·s, solid content of 10% by mass Poly-N-vinylacetamide PNVA (R)-4 (copolymer of N-vinylacetamide and sodium acrylate at a copolymerization ratio=90:10 (molar ratio)): GE167-103 (manufactured by Showa Denko K.K.), actual viscosity of 5000 mPa·s, solid content of 10% by mass

10

Carboxymethylcellulose CMC-Na: MAC350HC (manufactured by Nippon Paper Industries Co., Ltd.)

Polyvinylpyrrolidone: PVP K-90 (manufactured by Tokyo Chemical Industry Co., Ltd.)

Dispersant

Ammonium polyacrylate: Aron (R) A-30 SL (manufactured by Toagosei Co., Ltd.)

Sodium dodecylbenzenesulfonate: NEOPELEX (R) G-65 (manufactured by Kao Corporation)

Examples 1 to 10 and Comparative Examples 1 to 10

The specified amounts listed in Table 1 of ion-exchanged water, dispersant, binder, thickener, and filler were weighed in order in a 200 ml resin container and charged into a planetary centrifugal mixer (ARE-250, manufactured by THINKY CORPORATION). The mixer was tightly stoppered and mixed under the conditions of mixing for 60 seconds and deforming for 60 seconds to obtain a uniform coating liquid composition.

The dispersant, binder, and thickener are expressed in parts by mass of the solid content.

TABLE 1

| | | | Example 1 | Example 2 | Example 3 | Example 4 | Example 5 | Example 6 | Example 7 | Example 8 | Example 9 | Example 10 (parts by mass) |
|---|---|---|---|---|---|---|---|---|---|---|---|---|
| Filler | Alumina | AL160-SG-3 | 100 | 100 | 100 | | | | | | | |
| | Scaly boehmite | Cerasur | | | | 100 | | | 100 | 100 | 100 | 100 |
| | Scaly alumina | Cerasur α | | | | | 35 | 70 | | | | |
| Solvent | Water | Ion exchanged water | 100 | 100 | 100 | 120 | 100 | 100 | 120 | 120 | 120 | 120 |
| Dispersant | Ammonium polyacrylate | Aron A-30 SL | 1 | 1 | 1 | 1 | 1 | 1 | | 1 | 1 | 1 |
| | Sodium dodecyl-benzene-sulfonate | NEOPELEX G-65 | | | | | | | 1 | | | |
| Binder | Emulsion | LB-350 | 3 | 3 | 3 | 3 | 3 | 3 | | | | |
| | SBR | BM400B | | | | | | | 3 | 3 | 3 | 3 |
| Thickener | PNVA-1 | GE191-043 | 1.3 | 1 | 2 | 1 | 1 | 1 | 1 | | | |
| | PNVA-2 | GE191-104 | | | | | | | | 1 | | |
| | PNVA-3 | GE191-107 | | | | | | | | | 1 | |
| | PNVA-4 | GE167-103 | | | | | | | | | | 1 |
| | CMC-Na | MAC350HC | | | | | | | | | | |
| | PVP | K-90 | | | | | | | | | | |
| Percentage of filler in composition (%) | | | 49 | 49 | 49 | 44 | 25 | 40 | 44 | 44 | 44 | 44 |

| | | | Comparative Example 1 | Comparative Example 2 | Comparative Example 3 | Comparative Example 4 | Comparative Example 5 (parts by mass) |
|---|---|---|---|---|---|---|---|
| Filler | Alumina | AL160-SG-3 | 100 | 100 | 100 | 100 | 100 |
| | Scaly boehmite | Cerasur | | | | | |
| | Scaly alumina | Cerasur α | | | | | |
| Solvent | Water | Ion exchanged water | 100 | 100 | 100 | 100 | 100 |
| Dispersant | Ammonium polyacrylate | Aron A-30 SL | 1 | 1 | 1 | 1 | 1 |
| | Sodium dodecyl-benzene-sulfonate | NEOPELEX G-65 | | | | | |
| Binder | Emulsion | LB-350 | 3 | 3 | 3 | 3 | 3 |
| | SBR | BM400B | | | | | |
| Thickener | PNVA-1 | GE191-043 | | | | | |
| | PNVA-2 | GE191-104 | | | | | |
| | PNVA-3 | GE191-107 | | | | | |
| | PNVA-4 | GE167-103 | | | | | |

TABLE 1-continued

| | | | | | | |
|---|---|---|---|---|---|---|
| CMC-Na | MAC350HC | 1.3 | | 1 | | 2 |
| PVP | K-90 | | 1.3 | | 1 | |
| Percentage of filler in composition (%) | | 49 | 49 | 49 | 49 | 49 |

| | | | Comparative Example 6 | Comparative Example 7 | Comparative Example 8 | Comparative Example 9 | (parts by mass) Comparative Example 10 |
|---|---|---|---|---|---|---|---|
| Filler | Alumina | AL160-SG-3 | 100 | | | | |
| | Scaly boehmite | Cerasur | | 100 | 100 | | |
| | Scaly alumina | Cerasur α | | | | 35 | 35 |
| Solvent | Water | Ion exchanged water | 100 | 120 | 120 | 100 | 100 |
| Dispersant | Ammonium polyacrylate | Aron A-30 SL | 1 | 1 | 1 | 1 | 1 |
| | Sodium dodecyl-benzene-sulfonate | NEOPELEX G-65 | | | | | |
| Binder | Emulsion | LB-350 | 3 | 3 | 3 | 3 | 3 |
| | SBR | BM400B | | | | | |
| Thickener | PNVA-1 | GE191-043 | | | | | |
| | PNVA-2 | GE191-104 | | | | | |
| | PNVA-3 | GE191-107 | | | | | |
| | PNVA-4 | GE167-103 | | | | | |
| | CMC-Na | MAC350HC | | 1 | | 1 | |
| | PVP | K-90 | 2 | | 1 | | 1 |
| Percentage of filler in composition (%) | | | 49 | 44 | 44 | 25 | 25 |

The obtained coating liquid compositions were each evaluated as follows.

Coating Test Method

On a polypropylene sheet having a thickness of 16 μm as a substrate, 3.5 g of the obtained coating liquid composition was fixed with masking tape, and then placed on a coating stand of a coating machine on which the polypropylene sheet was fixed with double-sided tape (15 cm×30 cm: 0.1 μm in thickness), and coated using a bar coater (50 mm in width×5 μm in thickness, manufactured by YOSHIMITSU SEIKI) in an automatic coating machine (Pi-1210, manufactured by TESTER SANGYO CO., LTD.) at a speed of 200 mm/s.

Thereafter, the coated polypropylene sheet was dried in a hot air dryer at a temperature of 40° C. for 1 hour to prepare a coating film.

Rotational Viscosity

Using a Brookfield DV2T viscometer spindle SC4-28 water-jacketed small sample adapter, 20 g of the coating liquid composition was placed in a sample holder and the shear viscosity was measured at shear rates of 0.3 rpm and 100 rpm.

Solution Viscosity

The viscosity of the coating liquid composition at 23° C. was evaluated on a Brookfield DV2T viscometer spindle SC4-28 water-jacketed small sample adapter at 50 rpm.

TI Value

The TI value (thixotropy index) is calculated by the following equation.

TI value=viscosity at low shear rate of 0.01/s (Pa·s)/ viscosity at high shear rate of 10000/s (Pa·s)

Measurements were made using an AntonParr rotational viscometer (rheometer). Specifically, the viscosity at 23° C. was measured from a shear rate of 0.01 $\sec^{-1}$ to 10000 $\sec^{-1}$ over 400 seconds while increasing the rate, and continuously from 10000 $\sec^{-1}$ to 0.01 $\sec^{-1}$ over 400 seconds while decreasing the rate. The viscosity at each shear rate was defined as the value measured when the shear rate was lowered, and the ratio of the viscosities at the shear rates listed in Table 2 was determined.

Coating Film Thickness

Using a constant pressured thickness measurement instrument PF-11J manufactured by TECLOCK Co., Ltd., measurements were made at three points in total at the center of the coating film and two points 10 cm above and below the center according to JISK6400-1-2004 to calculate a weighted average thereof.

Appearance

The surface appearance of the coating film was evaluated based on the following criteria.

◯: No voids were observed on the coated surface.

Δ: No more than 10 voids were observed on the coated surface.

X: More than 10 voids were observed on the coated surface.

Surface Roughness Ratio

The surface roughness Ra was measured at three points in total at the center of the coating film and two points 10 cm above and below the center according to JIS B0601-2013 using a skid-type Surtronic Duo Surface Roughness Tester (manufactured by TAYLOR HOBSON) to calculate the average. Ra divided by the coating film thickness was defined as a surface roughness ratio.

13

Delamination

The printed surface (the surface opposite to the substrate) of the coating film was subjected to a pressure-sensitive adhesive tape peeling test with a 15 mm width cellophane tape manufactured by NICHIBAN Co., Ltd., and the adhesion between the coating film and polypropylene sheet was evaluated in three grades.

○: The coated portion was not peeled off.
Δ: The coated portion was peeled off.
X: The coated portion had been peeled off before the test.

Shrinkage Rate

The coating direction of the coating film was defined as an M direction, the direction perpendicular to the M direction as a T direction, and square samples of 1 cm square were cut out so that each side was aligned with the M direction and the T direction. Thereafter, the samples were each placed in an air oven with an internal temperature of 150° C. or 200° C., and heated under atmosphere for 15 minutes. For each of the M direction (coating direction) and the T direction (direction perpendicular to the coating direction), the shrinkage to the length (l) after heat treatment with respect to the length (L) before heat treatment was expressed as a percentage.

$$\text{Shrinkage rate (\%) in each direction} = (L-l)/L \times 100$$

The arithmetic mean of the shrinkage rates in the M and T directions was taken as the shrinkage rate.

TABLE 2

| | | | Example 1 | Example 2 | Example 3 | Example 4 | Example 5 |
|---|---|---|---|---|---|---|---|
| Rotational viscosity | (Low) shear stress (Pa)η0.3 | 0.3 rpm | 1.40 | 0.84 | 1.40 | 4.76 | 0.84 |
| | (High) shear stress (Pa)η100 | 100 rpm | 50.40 | 17.64 | 62.72 | 20.16 | 113.70 |
| | η100/η0.3 | | 36.00 | 21.00 | 44.80 | 4.24 | 135.36 |
| Solution viscosity | | 50 rpm (mPa·s) | 2220 | 780 | 2860 | 1080 | 1280 |
| Thixotropy | High shear stress (Pa·s) | 10000/s | 0.083 | 0.065 | 0.059 | 0.079 | 0.708 |
| | | 500/s | 0.2360 | 0.113 | 0.207 | 0.107 | 1.36 |
| | Low shear stress (Pa·s) | 0.01/s | 129000 | 111000 | 74400 | 276000 | 821000 |
| | | 0.1/s | 10600 | 9570 | 2270 | 16000 | 57000 |
| | | 1/s | 1410 | 407 | 3.29 | 453 | 3410 |
| | TI value | (1/s/10000/s) | 16988 | 6262 | 55.8 | 5706 | 4817 |
| | | (0.1/s/10000/s) | 127711 | 147231 | 38475 | 201520 | 80520 |
| | | (0.01/s/10000/s) | 1554217 | 1707692 | 1261017 | 3476220 | 1159766 |
| | | (0.1/s/500/s) | 44915 | 84690 | 10966 | 149533 | 41912 |
| | | (1/s/500/s) | 5975 | 3602 | 16 | 4234 | 2507 |
| Surface roughness | Surface roughness tester | Ra μm | 1.23 | 0.58 | 1.21 | 0.64 | 0.86 |
| | | Coating film thickness μm | 9.5 | 8.5 | 9.5 | 6.2 | 6.8 |
| Surface roughness ratio | | Ra(μm)/Coating film thickness (μm) | 0.129 | 0.068 | 0.127 | 0.103 | 0.126 |
| Shrinkage rate (%) | | 150° C. | 0.26 | 1.82 | 1.28 | 3.75 | 3.88 |
| | | 200° C. | 4.43 | 2.72 | 0.72 | 5.11 | 3.96 |
| | Delamination | | ○ | Δ | ○ | ○ | ○ |
| | Appearance | | ○ | Δ | ○ | ○ | ○ |

| | | | Example 6 | Example 7 | Example 8 | Example 9 | Example 10 |
|---|---|---|---|---|---|---|---|
| Rotational viscosity | (Low) shear stress (Pa)η0.3 | 0.3 rpm | 0.84 | 1.12 | 1.40 | 0.28 | 1.12 |
| | (High) shear stress (Pa)η100 | 100 rpm | over | 4.48 | 6.16 | 3.36 | 5.04 |
| | η100/η0.3 | | | 4.00 | 4.40 | 12.00 | 4.50 |
| Solution viscosity | | 50 rpm (mPa·s) | 320 | 240 | 340 | 160 | |
| Thixotropy | High shear stress (Pa·s) | 10000/s | 0.692 | 0.281 | 0.209 | 1.479 | |
| | | 500/s | 1.54 | 0.396 | 0.617 | 1.84 | |
| | Low shear stress (Pa·s) | 0.01/s | 647000 | 325000 | 286000 | 400000 | |
| | | 0.1/s | 70300 | 22900 | 23900 | 28000 | |
| | | 1/s | 9060 | 2930 | 2270 | 1510 | |
| | TI value | (1/s/10000/s) | 13097 | 10431 | 10868 | 1021 | |
| | | (0.1/s/10000/s) | 101621 | 81522 | 114425 | 18929 | |
| | | (0.01/s/10000/s) | 935262 | 1156975 | 1369268 | 270414 | |
| | | (0.1/s/500/s) | 45649 | 57828 | 38736 | 15217 | |
| | | (1/s/500/s) | 5883 | 7399 | 3679 | 821 | |
| Surface roughness | Surface roughness tester | Ra μm | 1.76 | 0.95 | 0.86 | 2.71 | 0.73 |
| | | Coating film thickness μm | 9.9 | 7.9 | 5.8 | 15.2 | 5.6 |
| Surface roughness ratio | | Ra(μm)/Coating film thickness (μm) | 0.178 | 0.120 | 0.148 | 0.178 | 0.130 |

TABLE 2-continued

| Shrinkage rate (%) | 150° C. | 5.71 | 8.33 | 1.99 | 8.60 | 4.20 |
|---|---|---|---|---|---|---|
| | 200° C. | 5.84 | 10.74 | 6.83 | 9.29 | 18.58 |
| Delamination | | ○ | ○ | ○ | Δ | ○ |
| Appearance | | ○ | ○ | ○ | ○ | Δ |

| | | | Comparative Example 1 | Comparative Example 2 | Comparative Example 3 | Comparative Example 4 | Comparative Example 5 |
|---|---|---|---|---|---|---|---|
| Rotational viscosity | (Low) shear stress (Pa)η0.3 | 0.3 rpm | 8.40 | 0.28 | 2.80 | 0.28 | 11.76 |
| | (High) shear stress (Pa)η100 | 100 rpm | 164.10 | 4.20 | 38.92 | 2.80 | 206.40 |
| | η100/η0.3 | | 19.54 | 15.00 | 13.90 | 10.00 | 17.55 |
| Solution viscosity | | 50 rpm (mPa · s) | 8800 | 200 | 1900 | 140 | 1230 |
| Thixotropy | High shear stress (Pa · s) | 10000/s | 0.085 | 0.017 | 0.051 | 0.016 | 0.111 |
| | | 500/s | 0.3780 | 0.0337 | 0.193 | 0.0318 | 0.522 |
| | Low shear stress (Pa · s) | 0.01/s | 23100 | 56300 | 54600 | 57000 | 50900 |
| | | 0.1/s | 310 | 7590 | 9360 | 6130 | 480 |
| | | 1/s | 9.37 | 417 | 92.8 | 646 | 18.5 |
| | TI value | (1/s/10000/s) | 110 | 24821 | 1820 | 40375 | 167 |
| | | (0.1/s/10000/s) | 3656 | 451786 | 183529 | 383125 | 4324 |
| | | (0.01/s/10000/s) | 272406 | 3351190 | 1070588 | 3562500 | 458559 |
| | | (0.1/s/500/s) | 820 | 225223 | 48497 | 192767 | 920 |
| | | (1/s/500/s) | 25 | 12374 | 481 | 20314 | 35 |
| Surface roughness | Surface roughness tester | Ra μm | 5.61 | 1.87 | 2.17 | 0.48 | 1.78 |
| | | Coating film thickness μm | 17.5 | 8.4 | 10.6 | 2.2 | 8.8 |
| Surface roughness ratio | | Ra(μm)/Coating film thickness (μm) | 0.321 | 0.223 | 0.205 | 0.218 | 0.202 |
| Shrinkage rate (%) | | 150° C. | 21.91 | 24.35 | 9.15 | 27.35 | 38.43 |
| | | 200° C. | 24.82 | 23.54 | 34.56 | 28.53 | 59.75 |
| Delamination | | | X | Δ | X | Δ | X |
| Appearance | | | X | X | X | X | Δ |

| | | | Comparative Example 6 | Comparative Example 7 | Comparative Example 8 | Comparative Example 9 | Comparative Example 10 |
|---|---|---|---|---|---|---|---|
| Rotational viscosity | (Low) shear stress (Pa)η0.3 | 0.3 rpm | 0.28 | 6.72 | 10.36 | 1.12 | 0.28 |
| | (High) shear stress (Pa)η100 | 100 rpm | 4.48 | 41.72 | 39.48 | over | 4.48 |
| | η100/η0.3 | | 16.00 | 6.21 | 3.81 | | 16.00 |
| Solution viscosity | | 50 rpm (mPa · s) | 220 | 1900 | 2200 | 7340 | 180 |
| Thixotropy | High shear stress (Pa · s) | 10000/s | 0.024 | 0.375 | 0.394 | 0.646 | 0.703 |
| | | 500/s | 0.0429 | 0.334 | 0.845 | 1.86 | 0.798 |
| | Low shear stress (Pa · s) | 0.01/s | 81000 | 342000 | 398000 | 601000 | 674000 |
| | | 0.1/s | 9090 | 17300 | 12300 | 46300 | 50500 |
| | | 1/s | 444 | 1550 | 523 | 1950 | 3270 |
| | TI value | (1/s/10000/s) | 18500 | 4129 | 1326 | 3020 | 4655 |
| | | (0.1/s/10000/s) | 378750 | 46089 | 31195 | 71716 | 71886 |
| | | (0.01/s/10000/s) | 3375000 | 911128 | 1009396 | 930912 | 959424 |
| | | (0.1/s/500/s) | 211888 | 51796 | 14556 | 24892 | 63283 |
| | | (1/s/500/s) | 10350 | 4641 | 619 | 1048 | 4098 |
| Surface roughness | Surface roughness tester | Ra μm | 1.68 | 3.36 | 1.37 | 2.14 | 2.26 |
| | | Coating film thickness μm | 8.4 | 16.1 | 6.4 | 10.3 | 11.1 |
| Surface roughness ratio | | Ra(μm)/Coating film thickness (μm) | 0.200 | 0.209 | 0.214 | 0.208 | 0.204 |
| Shrinkage rate (%) | | 150° C. | 7.00 | 49.39 | 16.18 | 35.61 | 54.19 |
| | | 200° C. | 33.36 | 68.62 | 20.60 | Unmeasurable due to loss of shape | 58.59 |
| Delamination | | | Δ | X | Δ | X | Δ |
| Appearance | | | X | X | X | X | X |

The items in the shaded portions of Example 6 and Comparative Example 9 could not be calculated. The shaded portion of Example 10 was not measured. The term "over" indicates the measurement limit or more.

From Table 2, the coating films of Examples all had a surface roughness ratio of 0.178 or less and provided smooth surfaces. On the other hand, the coating films of Comparative Examples all had a surface roughness ratio of 0.200 or more and did not have smooth surfaces.

From Table 2, the coating films of Examples had a shrinkage rate of 18.58% or less when heating at 200° C. In contrast, the coating films of Comparative Examples had a shrinkage rate of 20.60% or more when heating at 200° C., or could not be subjected to dimension measurement due to collapse of the shape of the coating films as shown in FIG. 2, which means being unsuitable at high temperatures.

From Table 2, no voids were observed in the surface appearance of any of the coating films of Examples. On the other hand, voids were observed in all of the coating films of Comparative Examples.

Regarding Example 4 and Comparative Examples 7 and 8, situations of the coating films before the heat resistance test were observed.

The situation observation of the sheet with a coating film before the heat resistance test is shown in FIG. 1, and the situation observation of the sheet with a coating film heated to 200° C. is shown in FIG. 2. In Comparative Examples 7 and 8, cracks and delamination occurred in the coating film on the sheet, while in Example 4, there was no change.

The invention claimed is:

1. A coating liquid composition, comprising:

a filler, a solvent, a dispersant, a thickener, and a binder, wherein the thickener is a poly-N-vinylcarboxylic acid amide, the thickener has a viscosity of 5000 mPa·s or more and 10,000 mPa·s or less in terms of actual viscosity, and when the coating liquid composition is applied to a substrate to form a coating film having a thickness of 0.5 to 20 μm, the coating film has a shrinkage rate of 20.0% or less when heating at 200° C. for 15 minutes.

2. The coating liquid composition according to claim 1, wherein the filler accounts for 20% by mass or more and 70% by mass or less of the coating liquid composition.

3. The coating liquid composition according to claim 1, wherein the thickener is poly-N-vinylacetamide.

4. The coating liquid composition according claim 1, wherein the solvent is water.

5. The coating liquid composition according to-claim 1, wherein the binder is an emulsion selected from an acrylic emulsion and a styrene-butadiene polymer emulsion.

6. The coating liquid composition according to-claim 1, wherein the substrate is a polyolefin film.

7. The coating liquid composition according to claim 6, wherein the polyolefin film is at least one selected from polyethylene and polypropylene.

8. The coating liquid composition according to claim 6, wherein the polyolefin film is a three-layer laminated film of polypropylene, polyethylene, and polypropylene.

9. The coating liquid composition according to claim 1, wherein a mass ratio of the filler to the thickener in the coating liquid composition is 0.1 or more and 200 or less.

10. A substrate with a coating film, comprising a coating film formed from the coating liquid composition according to claim 1 and a substrate.

11. A separator comprising the substrate with a coating film according to claim 10.

12. A secondary battery using the separator according to claim 11.

13. A lithium-ion secondary battery using the separator according to claim 11.

14. An electrode material comprising a coating film formed from the coating liquid composition according to claim 1 on a surface of a substrate.

\* \* \* \* \*